(12) United States Patent
From (10) Patent No.: US 7,552,895 B2
(45) Date of Patent: Jun. 30, 2009

(54) SYSTEM, APPARATUS AND METHOD TO IMPROVE THE AERODYNAMICS OF A FLOATPLANE

(76) Inventor: Dave From, Building 1, Red Deer Airport, Box 720, Penhold (CA) T0M 1R0

( * ) Notice: Subject to any disclaimer, the term of this patent is extended or adjusted under 35 U.S.C. 154(b) by 350 days.

(21) Appl. No.: 11/163,185

(22) Filed: Oct. 7, 2005

(65) Prior Publication Data

US 2006/0144999 A1    Jul. 6, 2006

Related U.S. Application Data

(60) Provisional application No. 60/616,633, filed on Oct. 8, 2004.

(30) Foreign Application Priority Data

Oct. 7, 2004    (CA)    ................................... 2484119

(51) Int. Cl.
B64C 35/00 (2006.01)
(52) U.S. Cl. .................. 244/105; 244/39; 244/101
(58) Field of Classification Search ................. 244/105, 244/106, 101, 50, 108, 102 A, 324, 37, 39; D12/324
See application file for complete search history.

(56) References Cited

U.S. PATENT DOCUMENTS

| 1,512,912 | A | 10/1924 | Driggs |
|---|---|---|---|
| 1,816,130 | A | 7/1931 | Sikorsky |
| 1,835,371 | A | 12/1931 | Bellanca |
| 1,928,317 | A | 9/1933 | Rippen |
| 2,532,610 | A | 12/1950 | Ditter |
| 2,964,271 | A | 12/1960 | Strawn |
| 3,136,505 | A | 6/1964 | Fleury |
| 3,190,582 | A | 6/1965 | Lipplsch |
| 3,627,235 | A | 12/1971 | Lippisch |
| 3,643,900 | A | 2/1972 | Maloney |
| 3,910,531 | A | 10/1975 | Leomand |

(Continued)

FOREIGN PATENT DOCUMENTS

CA    643467    6/1962

OTHER PUBLICATIONS

Non-Final Rejection in U.S. Appl. No. 11/246,269—Inventor's co-pending U.S. patent application which, due to courier delays, was filed 3 days subsequent to present electronically filed U.S. Appl. No. 11/163,185; and too late to properly claim priority to the Inventor's earlier filed Canadian application (unlike the electronic filing of current application which was filed in time to claim such priority).

Primary Examiner—Michael Carone
Assistant Examiner—Benjamin P Lee
(74) Attorney, Agent, or Firm—Sander R. Gelsing (57) ABSTRACT

The aerodynamics of a floatplane can be improved by providing a wing suitable for mounting on a spreader bar between floats of the floatplane, mounting said wing on the spreader bar between the floats of a floatplane, and preventing the wing from rotating around the spreader bar during flight operations. In one apparatus embodiment, the invention comprises a wing mountable on a spreader bar between floats of the floatplane, a plurality of ribs spaced along the wing's axis, each rib having a recess suitable for accepting the spreader bar, and torque-restraining means to prevent the wing from rotating around the spreader bar.

4 Claims, 15 Drawing Sheets

U.S. PATENT DOCUMENTS

| | | |
|---|---|---|
| 4,481,703 A | 11/1984 | Scott |
| 4,739,954 A | 4/1988 | Hamilton |
| 5,136,961 A | 8/1992 | Follett |
| 5,415,365 A | 5/1995 | Ratliff |
| 5,681,014 A | 10/1997 | Palmer |
| 5,727,495 A | 3/1998 | Reslein |
| 6,592,073 B1 | 7/2003 | Meekins |
| 2005/0236520 A1 | 10/2005 | Wukowitz |
| 2006/0145000 A1 | 7/2006 | Hensley |
| 2006/0145010 A1 | 7/2006 | Schmidt et al. |
| 2006/0284010 A1 * | 12/2006 | Meekins ............... 244/105 |

* cited by examiner

SYSTEM, APPARATUS AND METHOD TO IMPROVE THE AERODYNAMICS OF A FLOATPLANE

CROSS REFERENCE TO RELATED APPLICATION

This application is a regular application of U.S. Provisional Patent Application Ser. No. 60/616,633 filed Oct. 8, 2004 and entitled "System, apparatus and method to improve the aerodynamics of a floatplane", the entirety of which is incorporated herein by reference.

FIELD OF THE INVENTION

The field of present invention relates generally to the field of lift producing aerofoils or wings extending between the floats of a floatplane and, more particularly, to providing a retro-fit aerofoil or wing which can be easily mounted in place over a float spacer or spreader bar.

BACKGROUND OF THE INVENTION

It is well known that, during operation, floatplanes, sea planes and amphibious aircraft suffer from an undesirable aerodynamic drag due to the float structure and the floats, the struts and the spreader or spacer bars; said drag generally causing the aircraft to pull nose down.

U.S. Pat. No. 2,964,271 to Strawn provides one solution to this problem of aerodynamic drag, by disclosing an amphibious aircraft having a float structure with an integrated aerofoil or stub wing.

However, the design of Strawn does not provide a solution for existing airplanes having a traditional float structure; since Strawn discloses an entire amphibious airplane. Furthermore, Strawn's float structure incorporates landing gear, a pair of floats and a stub wing as one integrated unit.

Accordingly, there still exists a need to improve the aerodynamics of existing floatplanes, sea planes and amphibious aircraft without resorting to a replacement of the entire aircraft or of the existing float structure.

SUMMARY OF THE INVENTION

In one aspect of the invention there is provided an apparatus for improving the aerodynamics of an aircraft, said aircraft having a float structure with a pair of floats and a spreader bar between said floats, the apparatus comprising a wing mountable on said spreader bar between said floats and torque-restraining means to prevent the wing from rotating around the spreader bar during flight operations.

In one embodiment of the above aspect, the wing further comprises plurality of ribs spaced along the wing's axis, each rib having a recess suitable for accepting the spreader bar. In another embodiment, the torque-restraining means comprises a pair of brackets mounted on the top surface of the wing and a pair of struts connecting the brackets to the float structure. In yet another embodiment, the plurality of ribs each further comprise a second recess, rearward of the first recess, and the torque restraining means further comprises a rear spar mounted substantially perpendicular to the ribs and rearward of the spreader bar, a pair of rear spar brackets, one spar bracket mounted on each of said pair of floats and said rear spar mounted therebetween.

In a method aspect, the aerodynamics of a floatplane can be improved by providing a wing suitable for mounting on a spreader bar between floats of the floatplane, mounting said wing on the spreader bar between the floats of a floatplane, and preventing the wing from rotating around the spreader bar during flight operations.

DETAILED DESCRIPTION OF THE PREFERRED EMBODIMENTS

Reference is to be had to the Figures in which identical reference numbers identify similar components.

FIGS. 1a-2c show a first embodiment of an apparatus 1 for improving the aerodynamics of a floatplane, sea plane or amphibious aircraft 2, said aircraft 2 having a float structure 3 with floats or pontoons 3a and a front spreader or spacer bar 4 between the floats 3a. The apparatus 1 comprises a stub wing or aerofoil 6 removably mounted on the front spreader bar 4 between the floats 3a, and torque-restraining means 7 to prevent the wing 6 from rotating or torquing around the front spreader bar 4 during operation.

Preferably, the apparatus 1 further comprises a pair of left and right fairings 8a, 8b (see FIGS. 1e-1f and 5a-5b). Advantageously the fairing's 8a, 8b shape and dimensions are customized to a particular installation of the apparatus 1 between a particular set of floats 3a, thereby eliminating the need for the wing's 6 sides to be contoured to the particular three-dimensional profile of the particular set of floats 3a. More preferably the fairings 8a, 8b are comprised of a plurality of pieces so as to facilitate installation (see FIGS. 5a-5b). Another, two-piece, embodiment of the fairings 8a can be seen in FIGS. 4a-4f.

In other embodiments (not shown), the sides of the wing 6 are contoured or canted to provide an aerodynamic fit when the wing 6 is mounted on the spreader bar 4 and between a particular set of floats 3a.

The stub wing 6 comprises a plurality of ribs 10 spaced along the wing's 6 axis and a skin, sheet or sheeting 12 covering the ribs 10 creating an aerofoil. Each rib 10 has a recess 14, sized and located so as to accept the front spreader bar 4 at a substantially perpendicular angle across the ribs 10. The front spreader bar 4 is thus acting as the wing's 6 main or front spar. The sheeting 12 is mounted to, and generally covers, the ribs 10; as is customary in the field of aeronautical wing construction. Preferably, the sheeting 12 is fastened to the ribs in a conventional manner. More preferably, the sheeting 12 is fastened to the ribs using rivets, screws or nails. In this embodiment, a section of sheeting 12a over the recess 14 is flexible and removably attached to the ribs 10, so as to facilitate installation and removal of the wing 6 onto the front spreader bar 4 (see FIGS. 2a-2b). This is of particular advantage during a retro-fit of the apparatus 1 onto an aircraft's 2 existing float structure 3.

Preferably the recess 14 is located along the top of each rib 10; so that, when the wing 6 is mounted on the front spreader bar 4 and float structure 3 and the aircraft 2 is in operation, the upward force, as generated by the wing's 6 lift, will be transferred efficiently to the front spreader bar 4 via the ribs 10 without requiring any additional structural elements. Advantageously, the flexible and removable section of sheeting 12a is likewise located on the top of the wing 6 over the recesses 14 and the underside of the sheeting 12b can therefore be constructed as an uninterrupted surface or covering, so as to minimize water entry that may occur from any splashing generated by the floats 3a during operation of aircraft 2.

In another embodiment (not shown), the recess 14 in each rib 10 is located on the bottom of each rib 10 and the wing 6 further comprises additional structural elements (not shown) to ensure that the force, as generated by the wing's 6 lift, will be transferred efficiently to the spreader bar 4. Such additional structural elements are know to those skilled in the art and can include filler blocks (filler blocks are further described below).

Figure 1A:
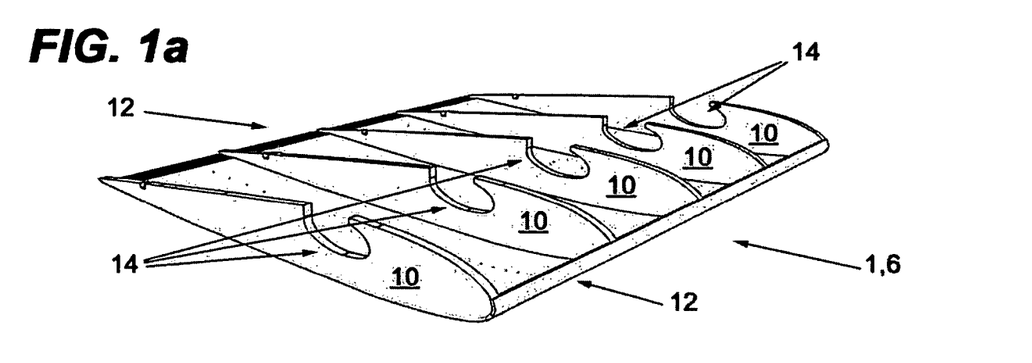
FIGS. 1a-1f are a perspective views of one embodiment of an apparatus for improving the aerodynamics of a floatplane, sea plane or amphibious aircraft (shown mounted on a floatplane in FIGS. 1d-1f)
Figure 1B:
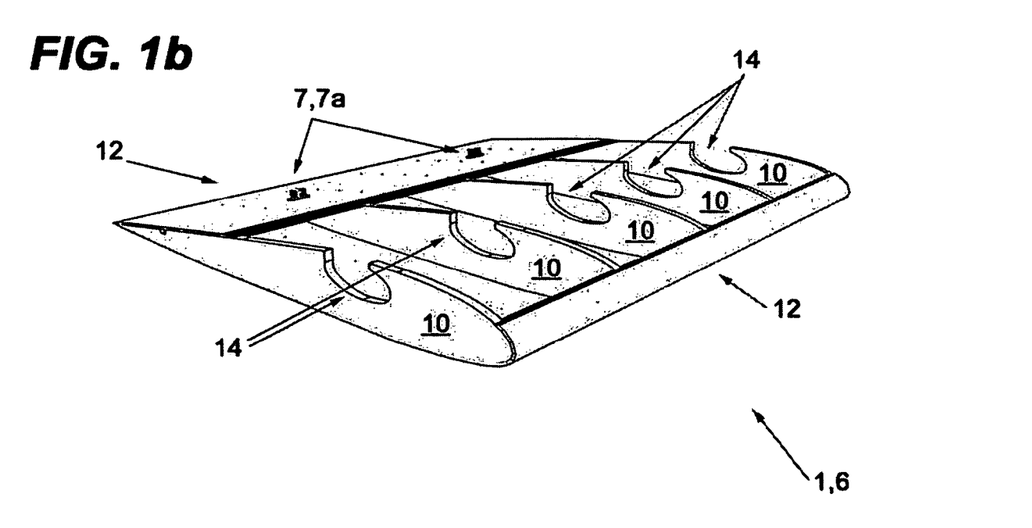
Figure 1C:
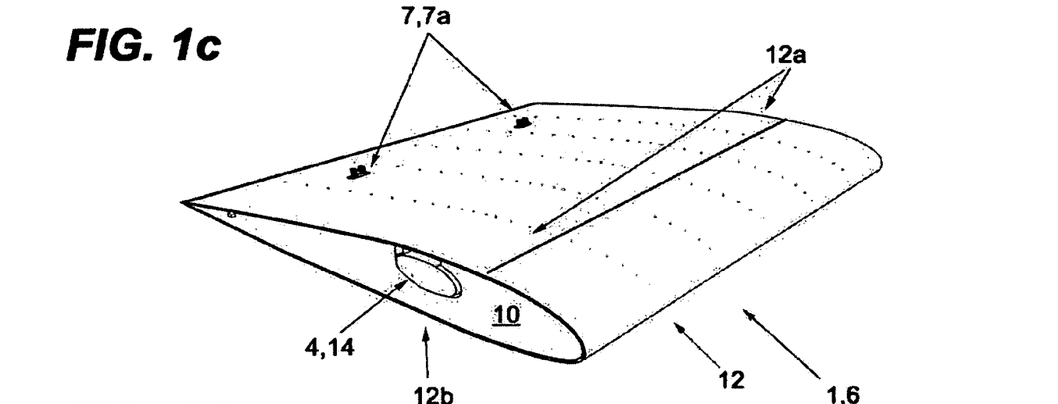
Figure 1D:
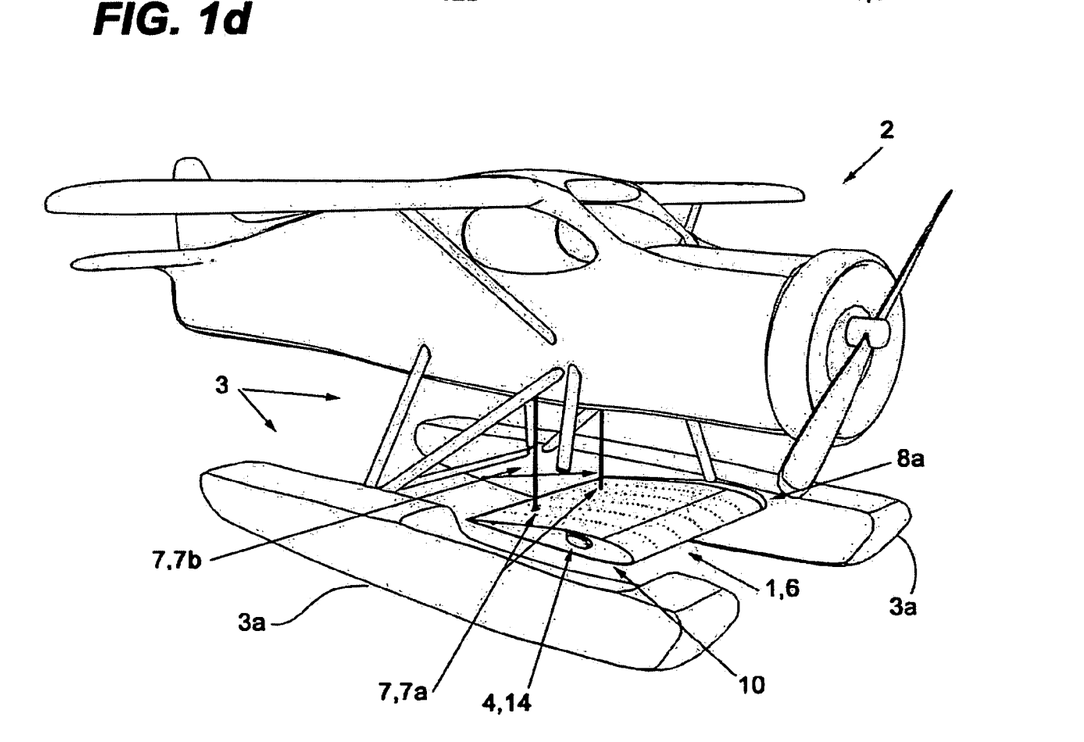
Figure 1E:
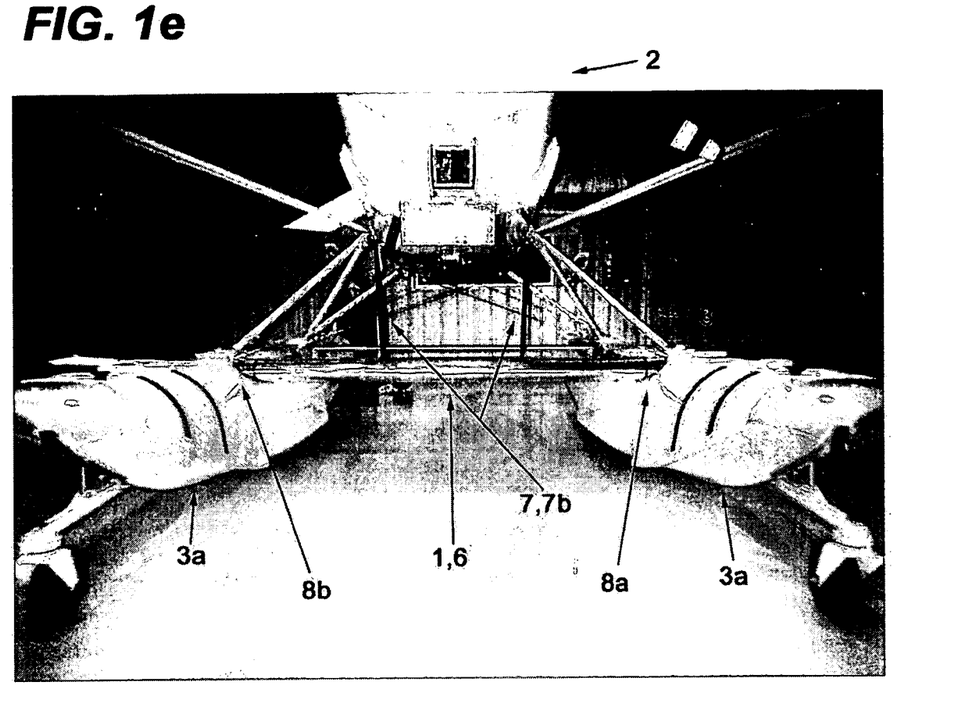
Figure 1F:
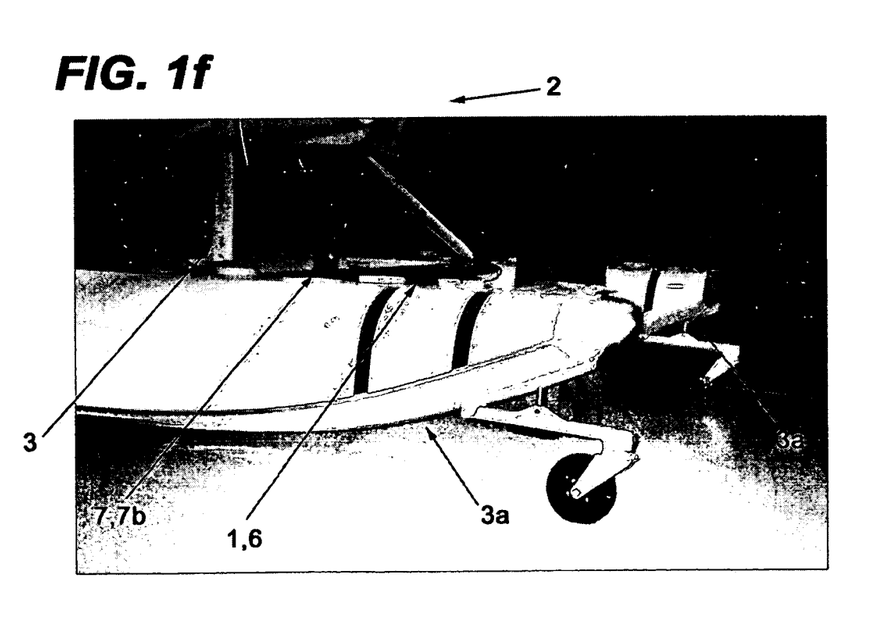
Figure 2A:
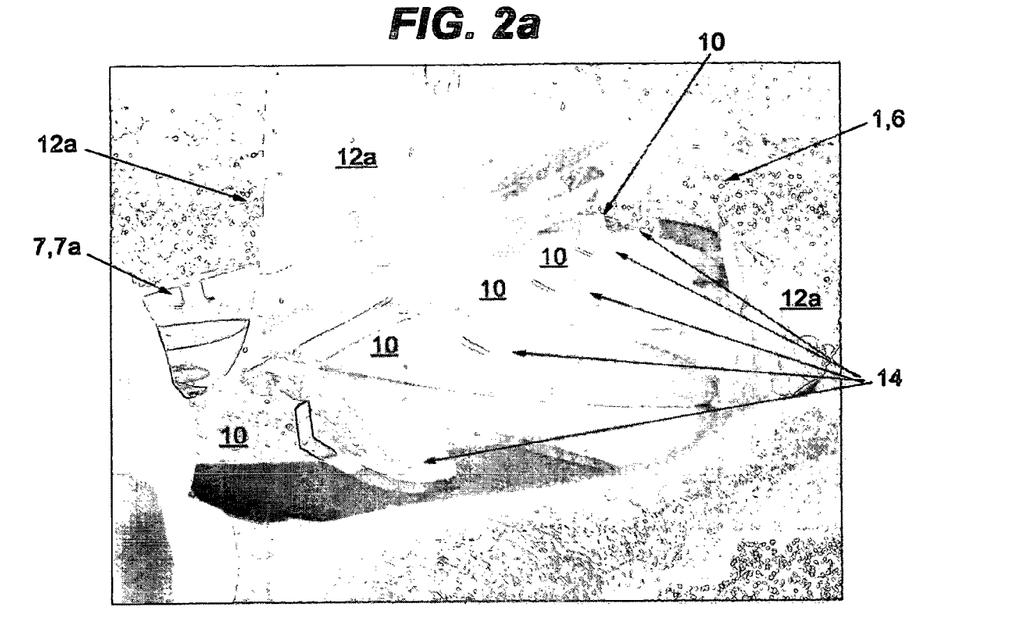
FIGS. 2a-2c are additional perspective views of the embodiment of FIGS. 1a-1f.
Figure 2B:
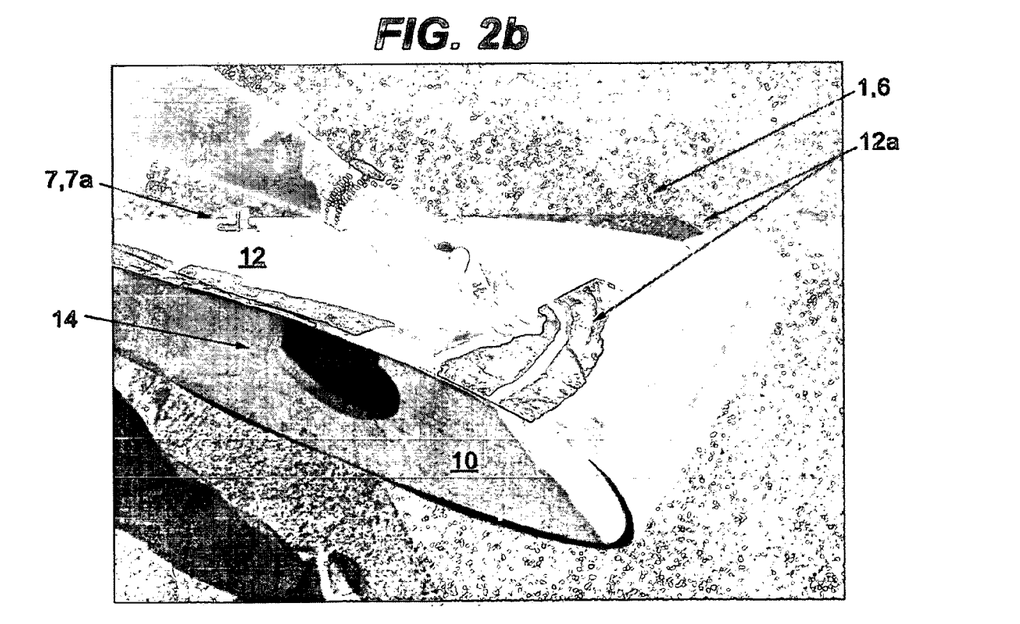
Figure 2C:
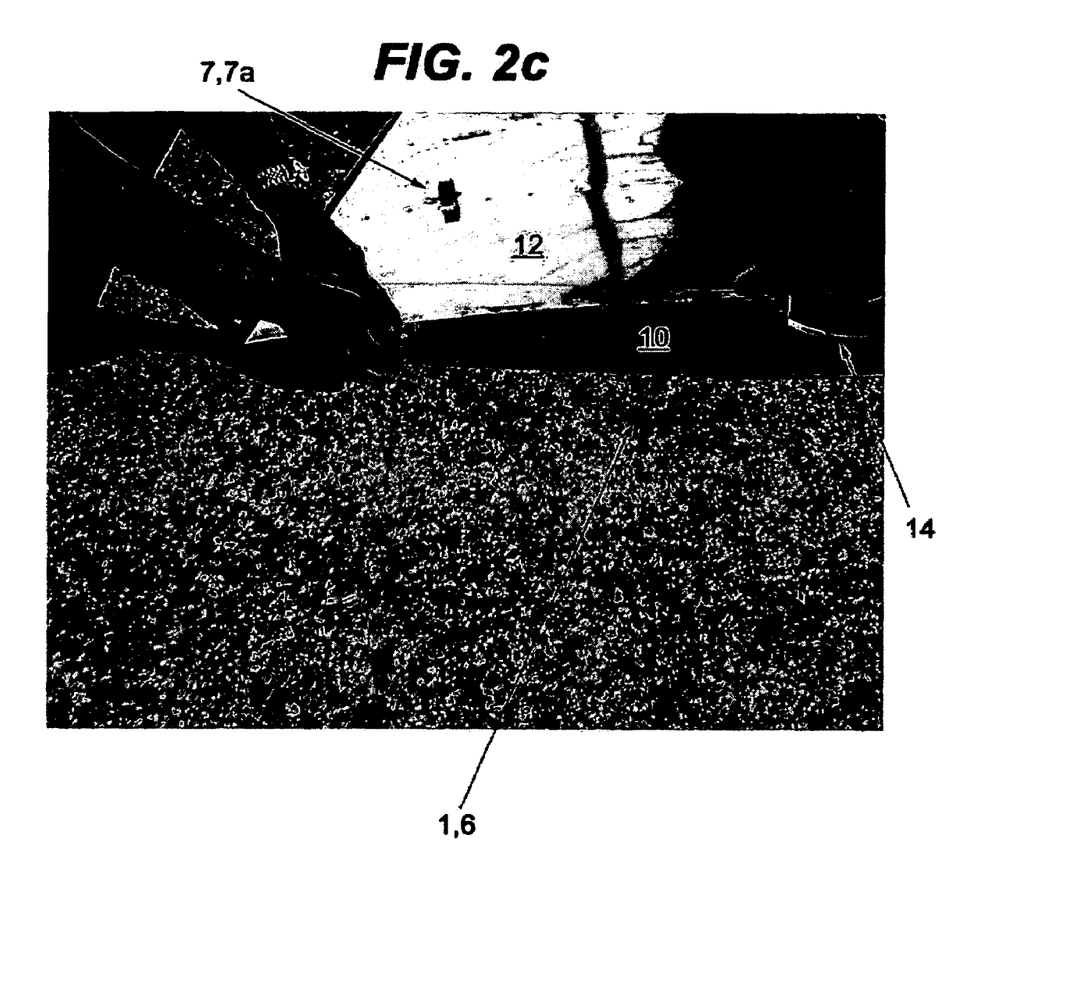

In the first embodiment (see FIGS. 1a-2c) the torque-restraining means 7 comprises a pair of brackets 7a mounted on the top surface of the wing 6 and a pair of struts 7b connecting the brackets 7a and the float structure 3 (see FIGS. 1d-1f).

Preferably, the apparatus 1 is mounted on the front spreader bar 4 such that the wing 6 is at substantially the same angle as the main wing of the aircraft 2. However, the angle of the wing 6 may be adjusted so as to provide more or less lift as may be desired. This may be accomplished by adjusting the torque-restraining means 7 and/or the shaping of the recess 14. More preferably, the apparatus 1 is mounted on the front spreader bar 4 such that the wing 6 and the main wing of the aircraft 2 are in a stagger wing configuration, thereby providing increased stability to the aircraft.

Suitable materials for construction of the fairings 8a, 8b and the sheeting 12 include aluminum, aluminum alloy or fiberglass. Suitable materials for construction of the ribs 10 include composite materials, closed cell foam, metal, aluminum, aluminum allow or wood. A suitable aluminum alloy for the fairings 8a, 8b and sheeting is 2024-T3.

Second Embodiment

Figure 3A:
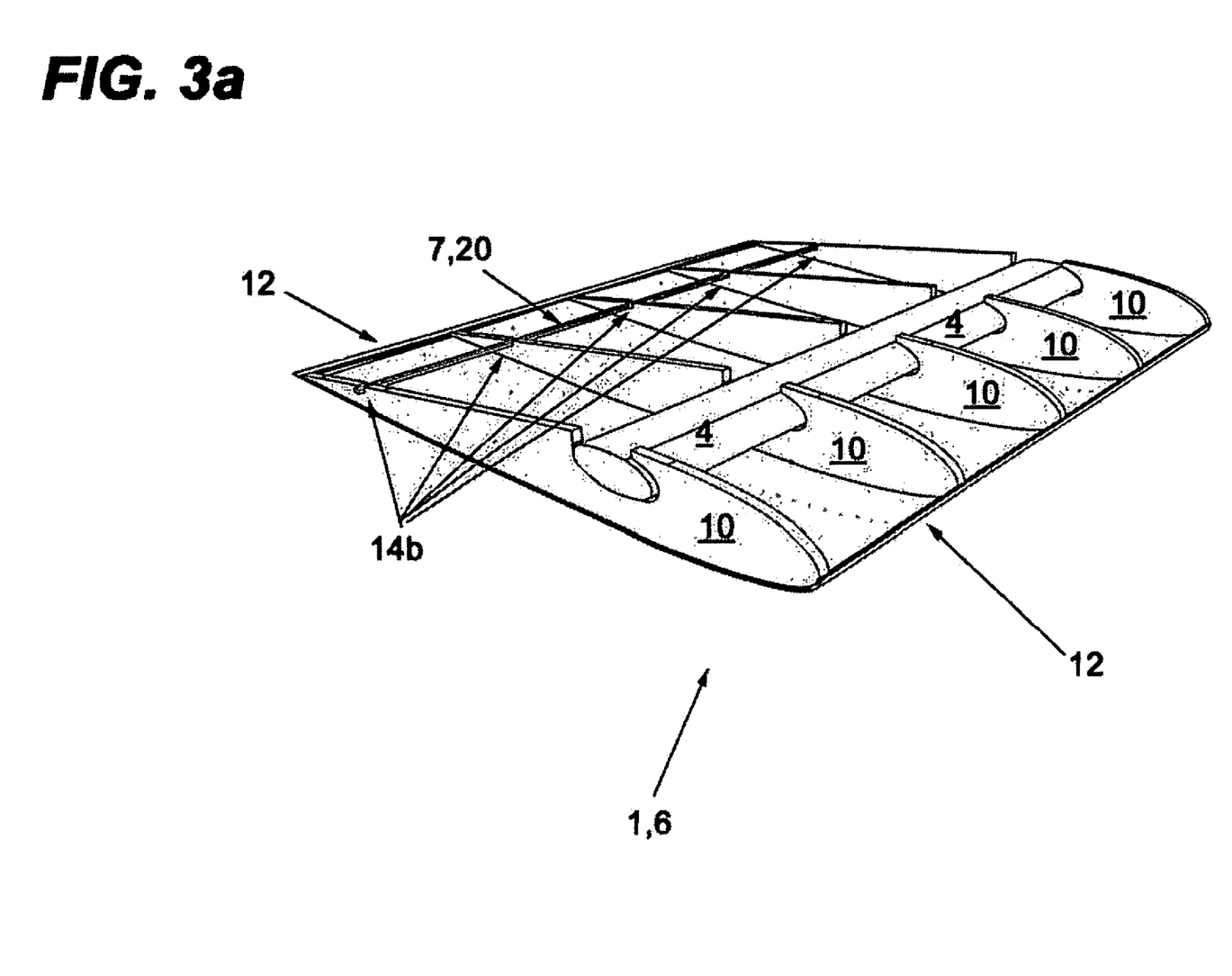
FIGS. 3a-3c are a perspective views of a second embodiment of an apparatus for improving the aerodynamics of a floatplane, sea plane or amphibious aircraft.
Figure 3B:
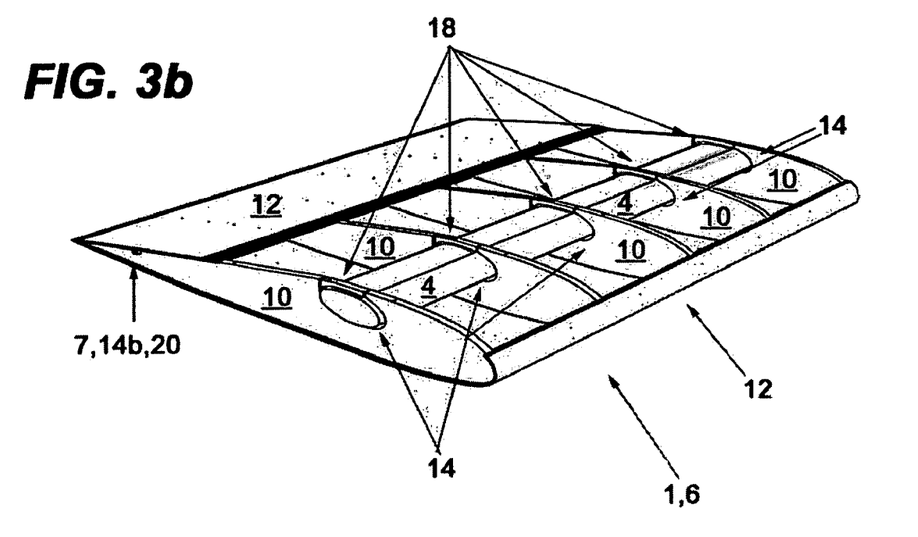
Figure 3C:
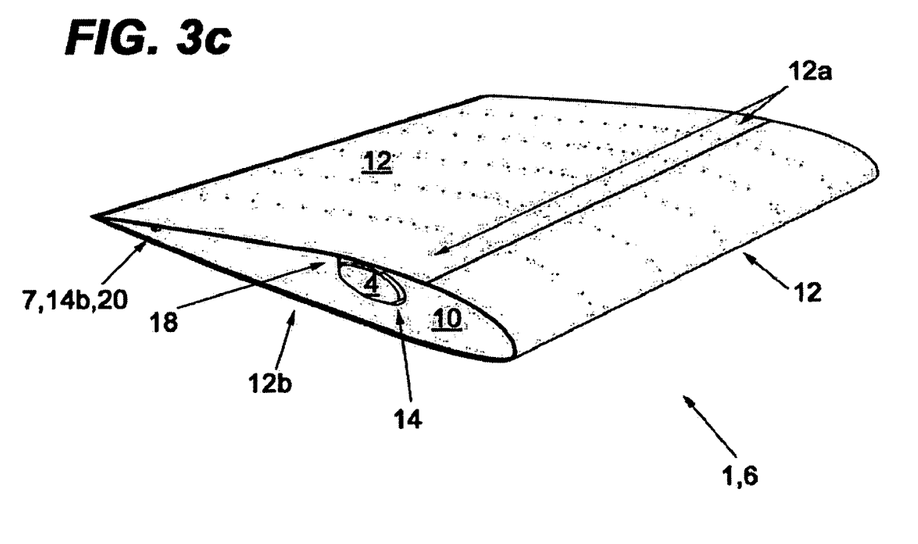
Figure 4A:
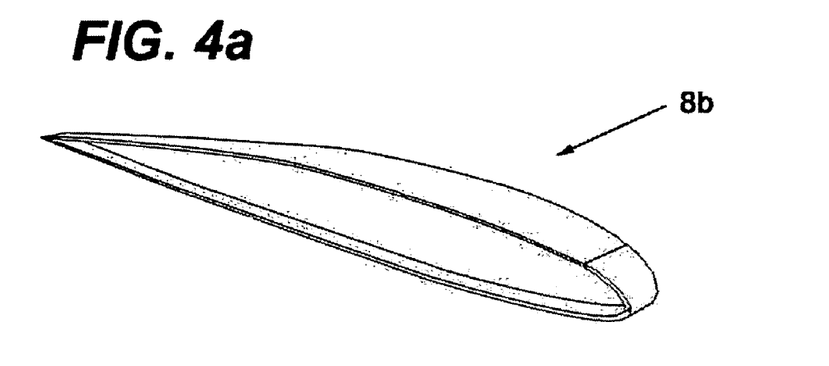
FIGS. 4a-4d are perspective, exploded perspective, bottom perspective and top views respectively of one embodiment of a pair of fairings, the right sided version is shown, the left sided version (not shown) being a mirror image of the right sided version.
Figure 4B:
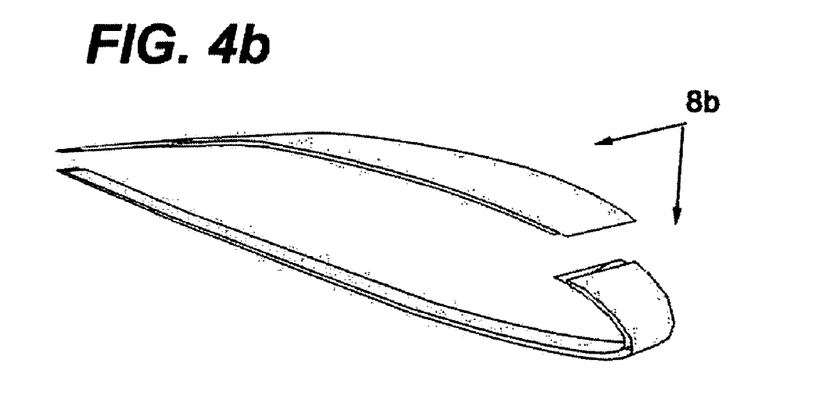
Figure 4C:
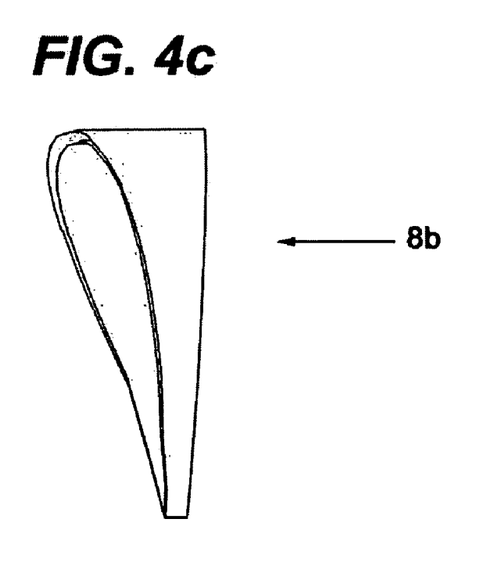
Figure 4D:
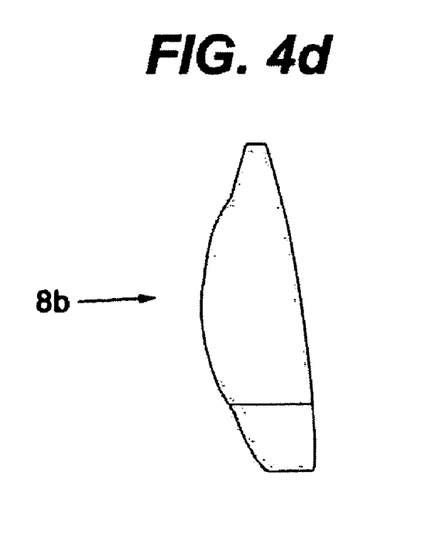
Figure 4E:
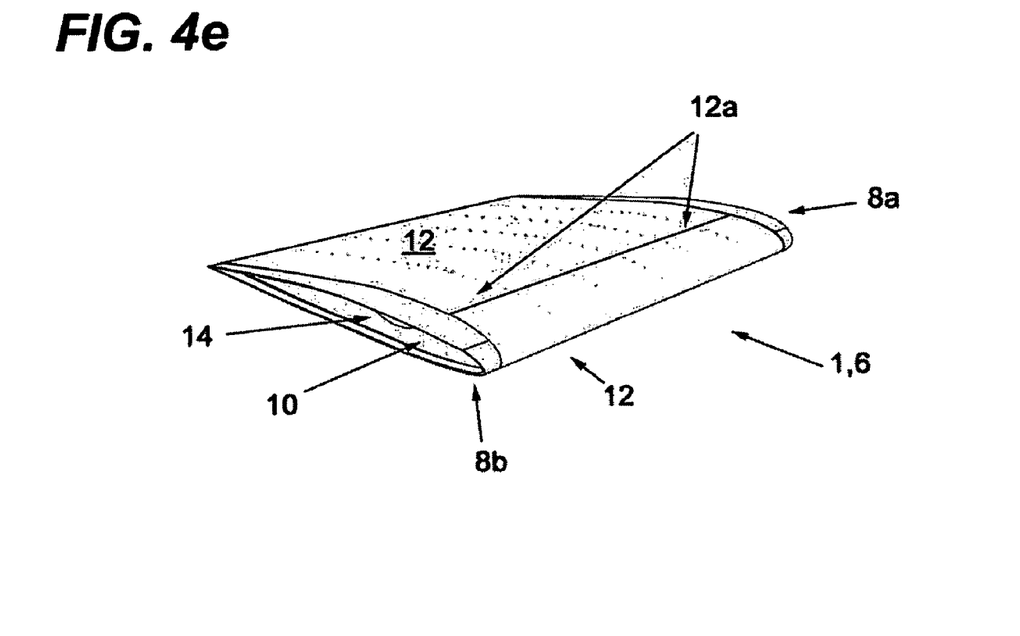
FIG. 4e is a perspective view of a pair of fairings of the embodiment of FIGS. 4a-4d shown mounted against the second embodiment of the apparatus.
Figure 4F:
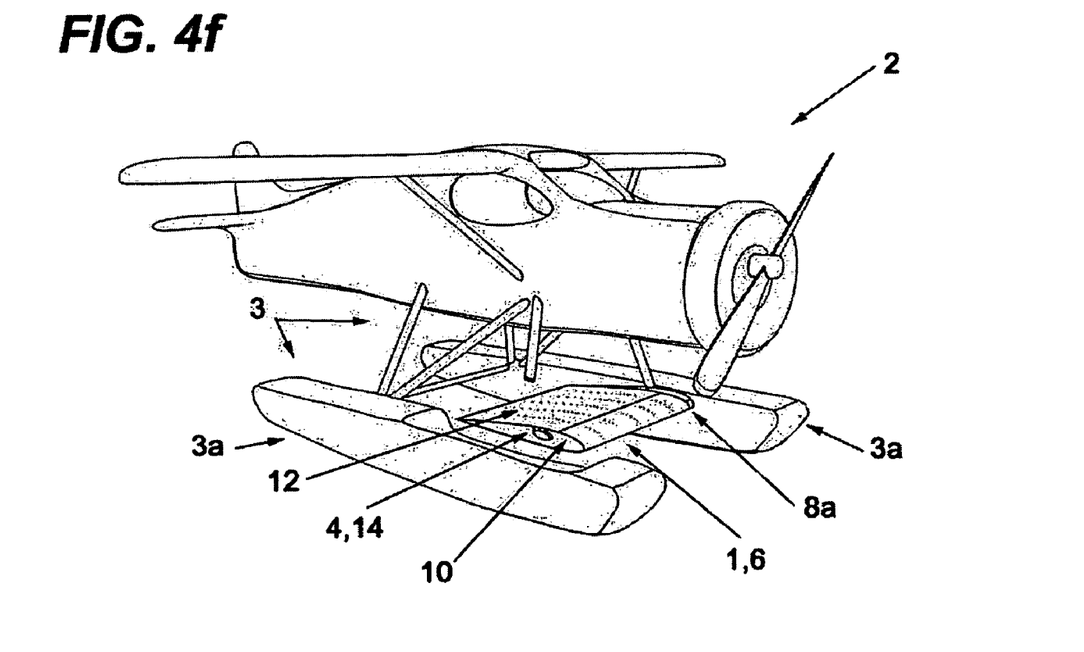
FIG. 4f is a perspective view of the second embodiment of the apparatus, and a left sided fairing of the embodiment of FIGS. 4a-4d, shown mounted on a floatplane.
Figure 5A:
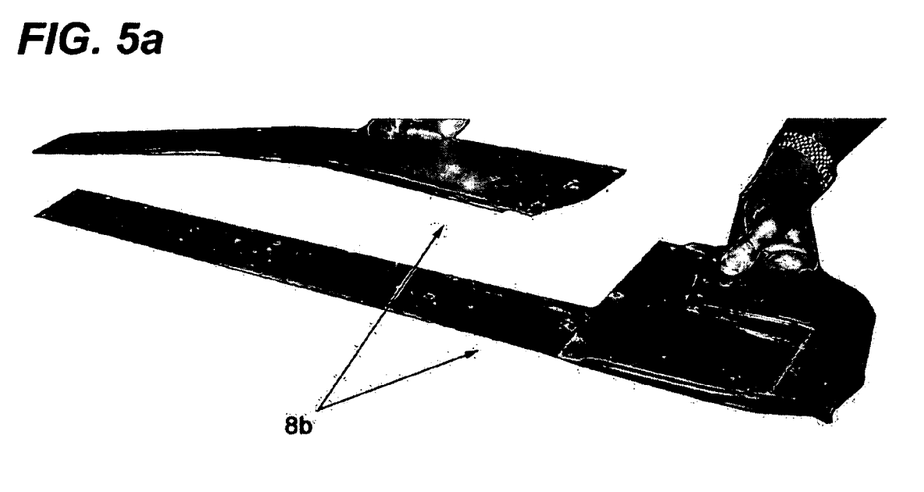
FIGS. 5a-5b are perspective views of a second embodiment of a pair of fairings, the right sided version is shown, the left sided version (not shown) being a mirror image of the right sided version.
Figure 5B:
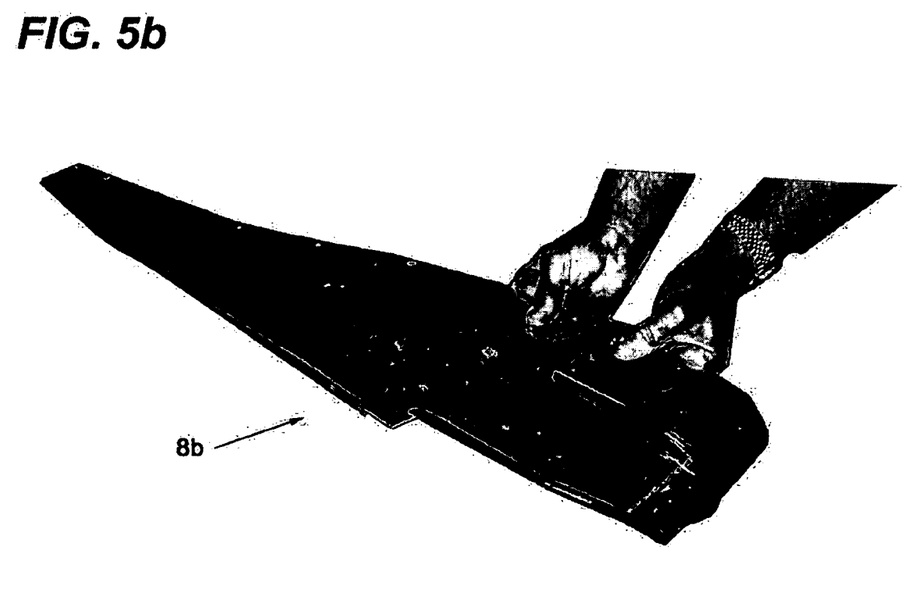

Now referring to FIGS. 3a-3c a second embodiment of the apparatus 1 is shown. The second embodiment is substantially similar to the first embodiment, with the primary difference being the torque-restraining means 7, which in this embodiment comprise a rear spar 20, mounted perpendicular to the ribs 10 and rearward of the front spreader bar 4 inside a second recess 14b in the ribs 10, and a pair of rear spar brackets (not show). One rear spar bracket is mounted on either float 3a and the rear spar 20 connect between the pair of brackets; that is, each rear spar bracket connects an end of the rear spar 20 to the floats 3a. Preferably the rear spar brackets are positioned so as to be inside the fairings 8a, 8b, so as to reduce any aerodynamic drag that the brackets may create.

Preferably, the second embodiment of the apparatus 1 further comprises filler blocks 18 positioned over the spreader bar 4 and underneath the sheeting 12 so as to fill in the remaining space of the recess 14 after the spreader bar is has been placed in said recess 14 (see FIGS. 3b and 3c). Advantageously, the filler blocks 18 provide additional structural support to the apparatus 1 and assist to keep the apparatus 1 in place while the aircraft 2 is not in operation and the only force acting on the apparatus 1 is gravity.

Third Embodiment

Figure 7A:
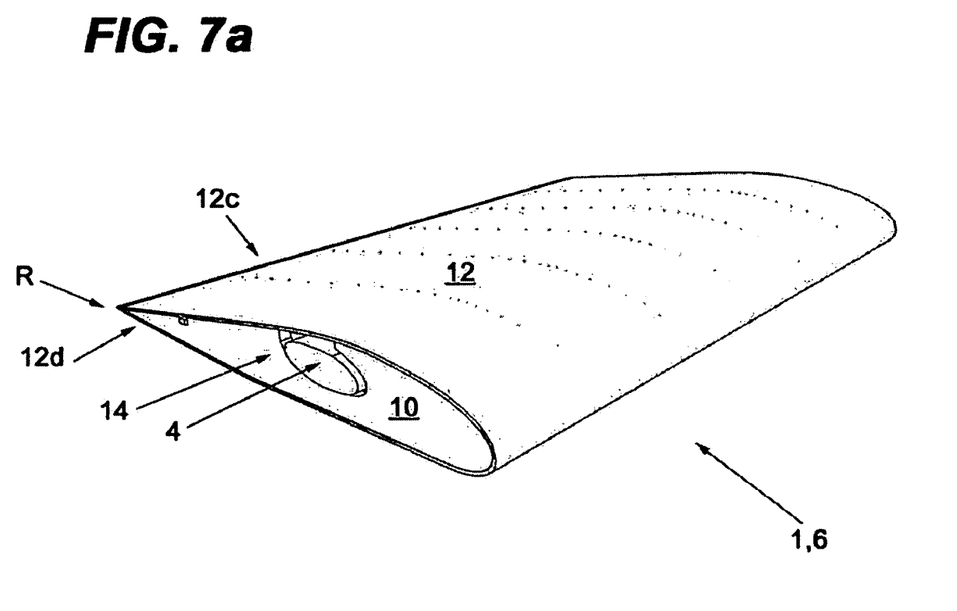
FIGS. 7a-7b are perspective and side views, respectively, of a third embodiment of the apparatus.
Figure 7B:
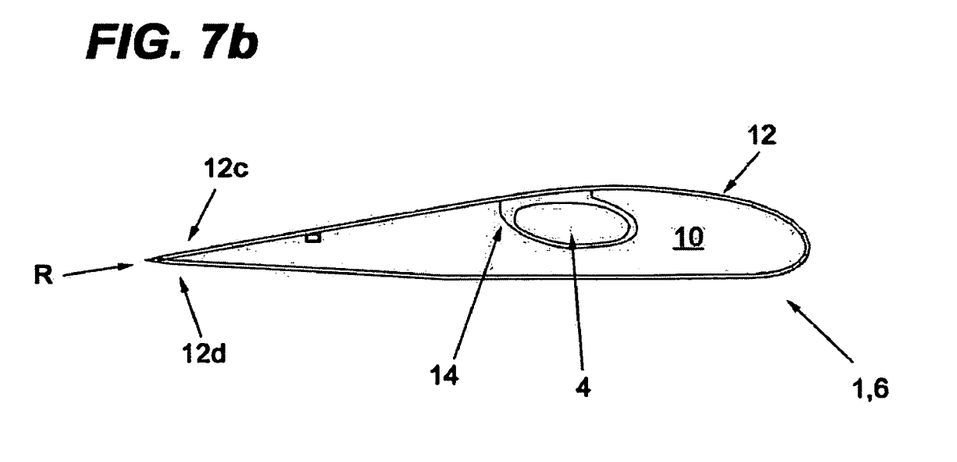

Now referring to FIGS. 7a-7b a third embodiment of the apparatus 1 is shown. The third embodiment is substantially similar to the second embodiment, with the primary difference being that the sheeting 12, although flexible, is continuous; including the section over the recess 14. In this embodiment the sheeting 12 is removably attached to the ribs 10 by folding it over the ribs and having the opposite ends of the sheeting 12c, 12d meet at the rear-most point of the ribs at point R.

Fourth Embodiment

Figure 8A:
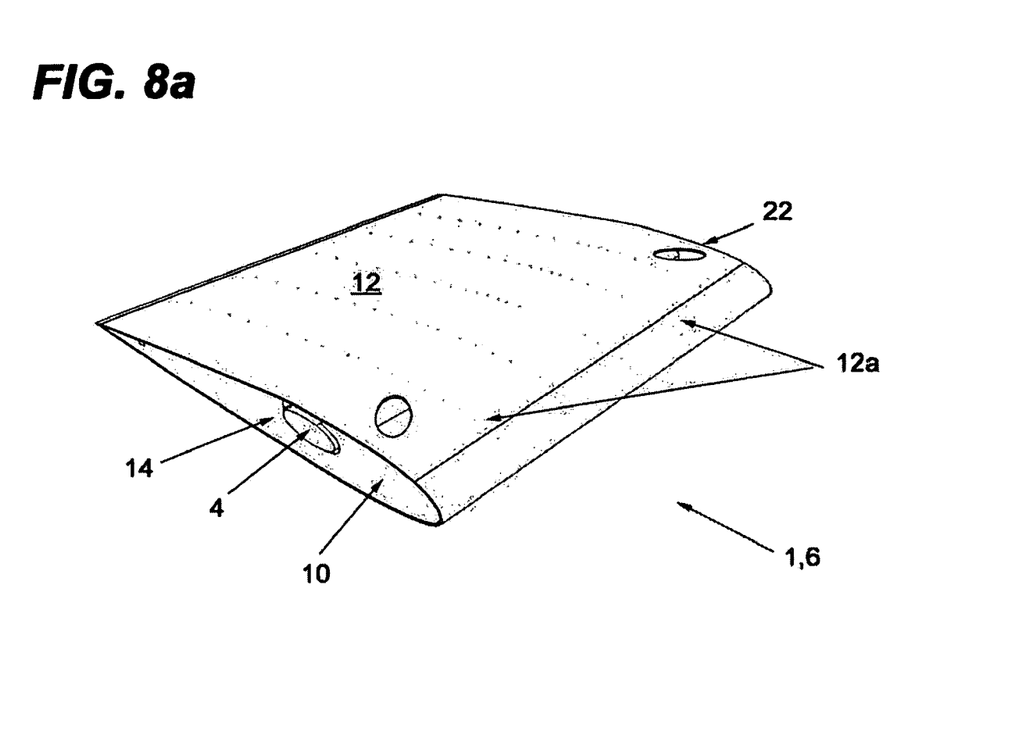
FIGS. 8a-8b are perspective views of a fourth embodiment of the apparatus (shown mounted on a floatplane in FIG. 8b)
Figure 8B:
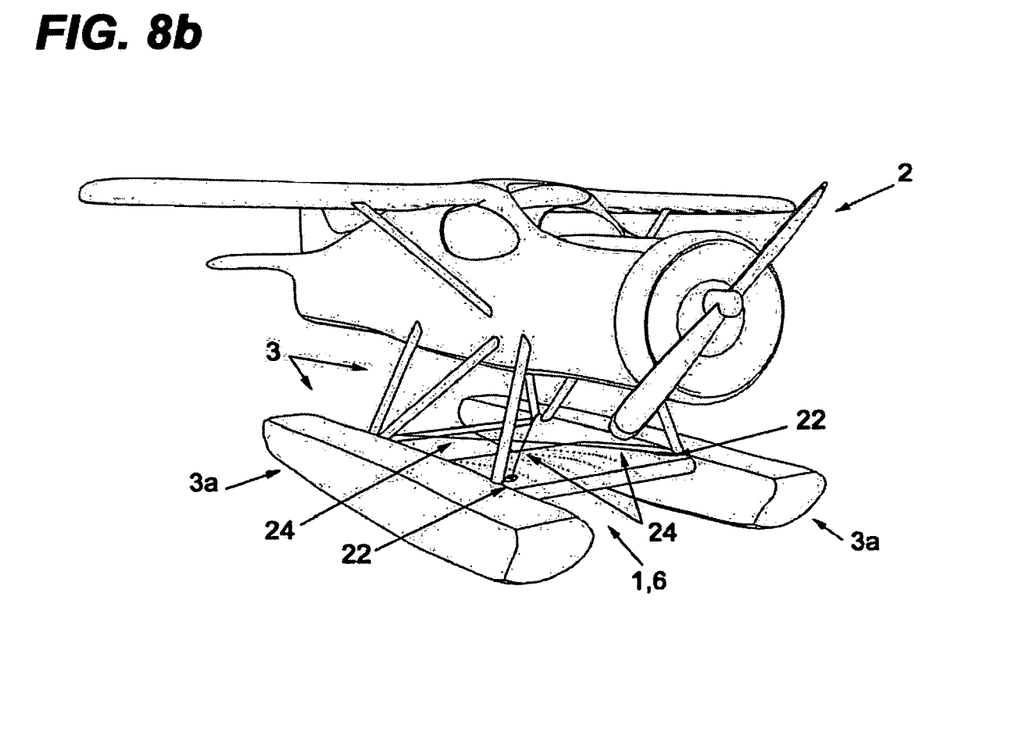

Now referring to FIGS. 8a-8b a fourth embodiment of the apparatus 1 is shown. The fourth embodiment is substantially similar to the second embodiment, with the primary difference being that the sheeting 12 includes openings 22 to facilitate passage of boxing wires 24 that may need to be connected between the spacer bar 4 and other structural components of the aircraft 2 as bracing.

Fifth Embodiment

Figure 9A:
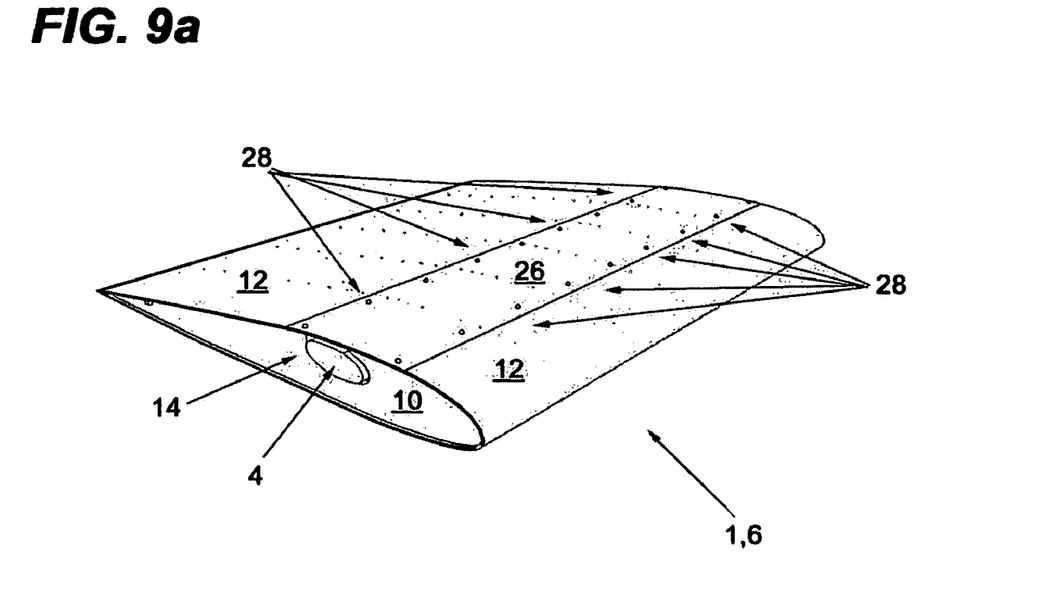
FIGS. 9a-9b are perspective views of a fifth embodiment of the apparatus (shown mounted on a floatplane in FIG. 9b)
Figure 9B:
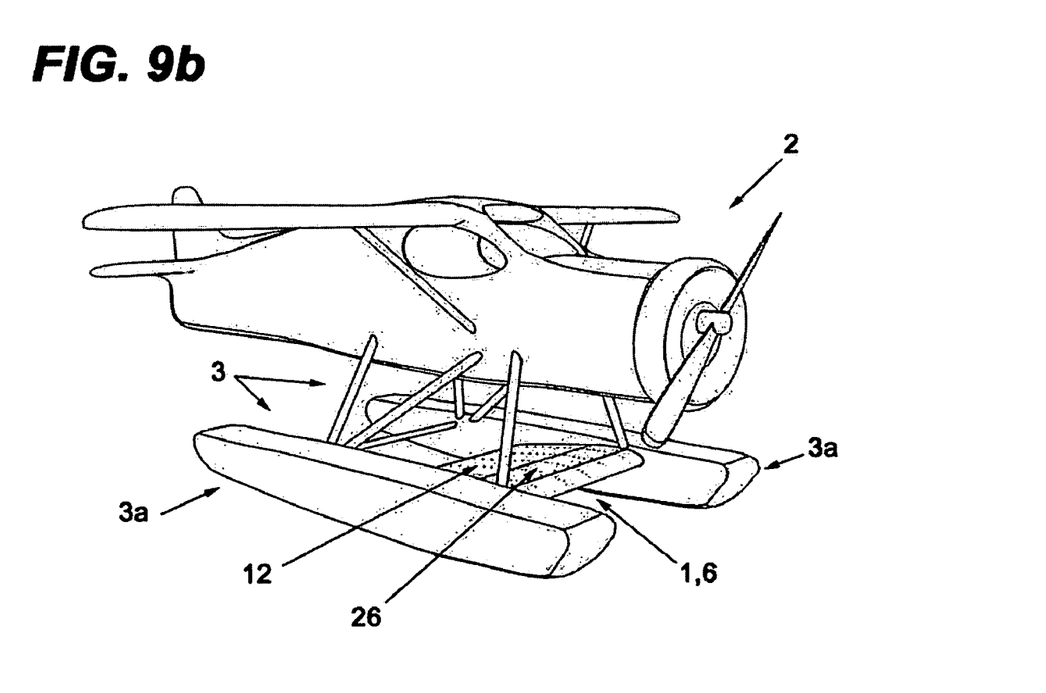

Now referring to FIGS. 9a-9b a fifth embodiment of the apparatus 1 is shown. The fifth embodiment is substantially similar to the second embodiment, with the primary difference being that the flexible and removable section of sheeting 12a over the recesses 14 has been replaced with a removable cap strip, cover plate or stress panel 26. Preferably the panel 26 is removably mounted to the wing 6, and over the spreader bar 4, by means of pitched screws 28.

Sixth Embodiment

A sixth embodiment (not show) is substantially similar to the second embodiment, with the primary difference being that the rear spar and the rear spar mounting brackets further comprise variable incidence means to raise or lower the rear spar relative to the float structure, thereby adjusting the incidence or angle of the wing 6 so as to provide more or less lift as may be desired.

One embodiment of the variable incidence means comprises a track with a slot mechanism, connected between the rear spar and rear spar mounting brackets and actuated by a linear actuator, similar to the electric flap mechanism in a Cessna. Another embodiment of the variable incidence means comprises a mechanism similar to the stabilizer trim jacks of a Cessna 180 or 185.

Installation

Figure 6A:
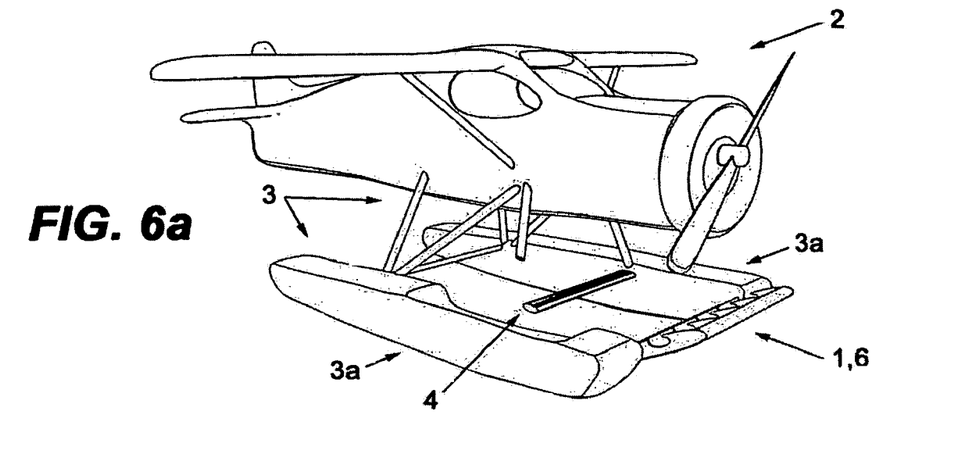
FIGS. 6a-6f are perspective views of various stages or steps of installation of the second embodiment of the apparatus, and a left sided fairing of the embodiment of FIGS. 4a-4d, onto a floatplane.
Figure 6B:
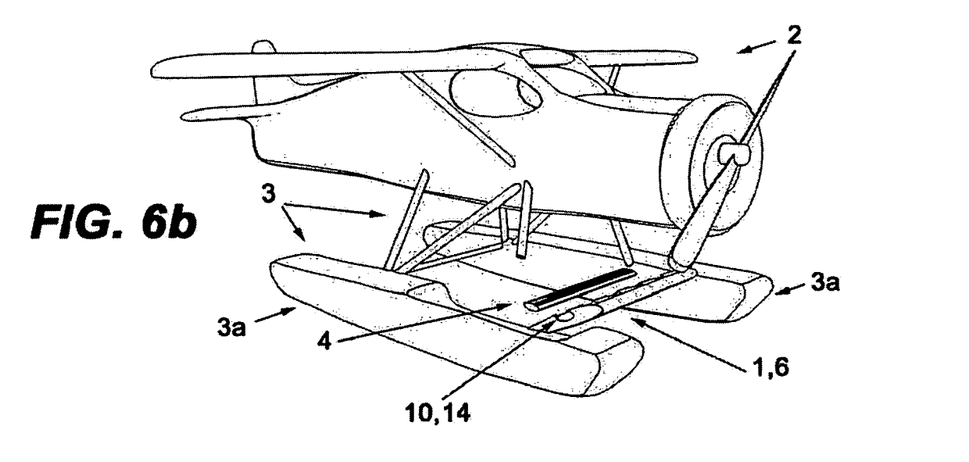
Figure 6C:
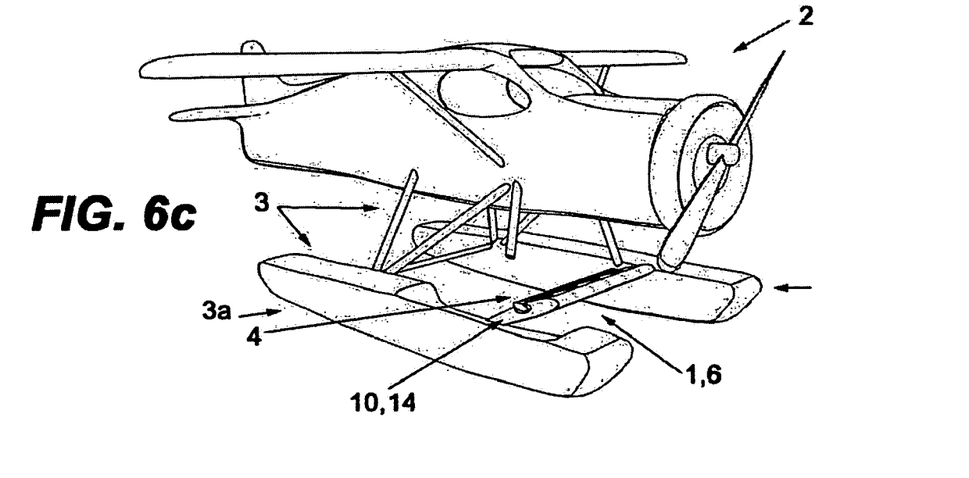
Figure 6D:
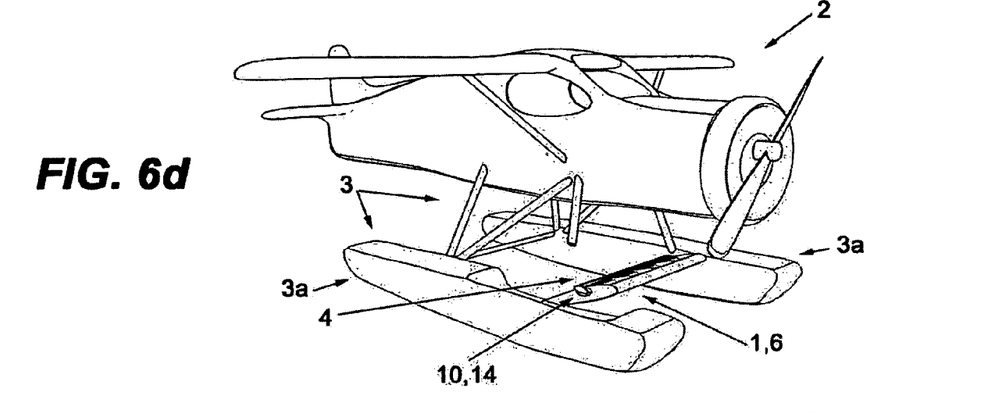
Figure 6E:
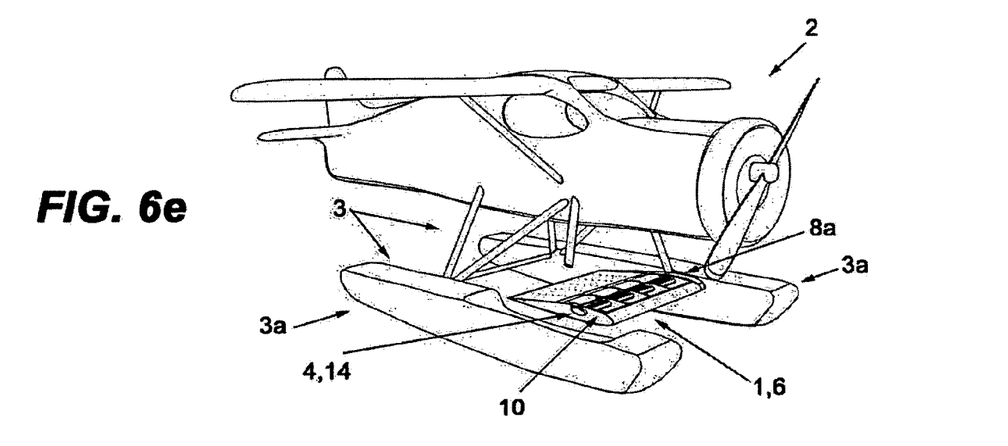
Figure 6F:
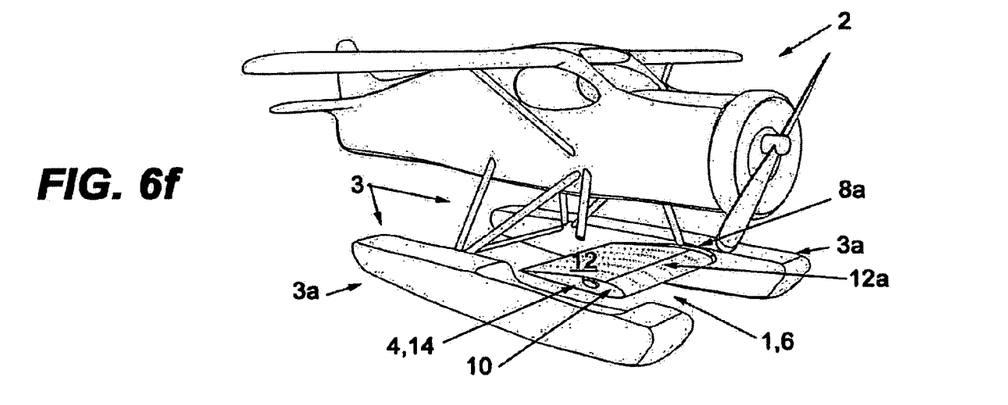

The second embodiment of the apparatus 1 may be installed by moving the wing 6 from a position in front of the front spreader bar 4 (see FIG. 6*a*) to a position underneath the front spreader bar 4 (see FIG. 6*b*), flexing the section of sheeting 12*a* temporarily out of the way (see FIG. 2*a*), fitting the front spreader bar 4 into the ribs 10 recess 14 (see FIG. 6*c*-6*e*), securing the section of sheeting 12*a* in place over the front spreader bar 4 and connecting the torque-restraining means 7 to the float structure 3. Preferably, fairings 8*a*, 8*b* are also installed.

The other embodiments of the apparatus 1 may be installed in a similar manner as described above. For example the fifth embodiment of the apparatus 1 may be installed by moving the wing 6 from a position in front of the front spreader bar 4 to a position underneath the front spreader bar 4, removing the panel 26, fitting the front spreader bar 4 into the ribs 10 recesses 14, securing the panel 26 in place over the front spreader bar 4 (preferably with pitched screws 28) and connecting the torque-restraining means 7 to the float structure 3.

The apparatus 1 may also be installed in a number of other ways, such as by removing one of the floats 3*a* and sliding the wing 6 in place over the front spreader bar 4 or by building the wing 6 in place around the front spreader bar 4.

Examples of Dimensions

Depending on the particular aircraft 2 on which the apparatus 1 is to be used, the dimensions of the apparatus 1 will vary. For example, the table below illustrates chord measurements of the apparatus 1 which are suitable for particular types or models of aircraft 2:

| Chord Measurement | | Aircraft model |
|---|---|---|
| 23-30 | inches | Superchamp, Scout, Supercub |
| 1 | meter | Cessna 180, 185, 206 |
| 4½-5 | foot | Beaver |
| 5 | foot | Norseman and Otter |
| 6 | foot or more | Fire Boss |

Depending on the exact aerodynamic qualities desired, the chord measurements may vary from the above examples. Likewise the aerofoil, or surface shape of the wing, will be determined according to conventional aeronautic and aerodynamic principles and the exact aerodynamic qualities desired. A NACA 23012 aerofoil is a suitable aerofoil.

Advantages

Advantages of the apparatus 1 includes improved aerodynamics of the aircraft 2 onto which the apparatus 1 is mounted, the ability to be retrofit onto existing float structures 3, minimal damage to the float structure 3 upon removal of the apparatus 1 (e.g. removal of rear spar mounting brackets would leave only small holes in the floats 3*a* which can be easily patched) and increased load rating for the aircraft 2 due to the improved aerodynamics and increase in aircraft total wing surface area.

What is claimed is:

1. An apparatus for improving the aerodynamics of an aircraft, said aircraft having a float structure with a pair of floats and a spreader bar between said floats, the apparatus comprising:
   a wing mountable on said spreader bar between said floats;
   torque-restraining means to prevent the wing from rotating around the spreader bar during flight operations; and
   variable incidence means to allow adjustment of the incidence of the wing relative to the float structure during flight operations.

2. The apparatus of claim 1 further comprising:
   a plurality of ribs spaced along the wing's axis, each rib having a recess suitable for accepting the spreader bar.

3. The apparatus of claim 2, wherein the torque restraining means further comprises:
   a rear spar mounted substantially perpendicular to the ribs and rearward of the spreader bar; and
   wherein the variable incidence means operates to raise or lower the rear spar relative to the float structure.

4. The apparatus of claim 3 wherein the underside of the wing is constructed as a substantially uninterrupted surface to minimize water entry that may occur from any splashing generated by the floats during operation of the aircraft.

* * * * *